US008965421B1

(12) United States Patent
    Sanjeev (10) Patent No.:     US 8,965,421 B1
(45) Date of Patent:     Feb. 24, 2015

(54) FORWARDING A MESSAGE TO A NETWORK DEVICE

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 734 days.

(21) Appl. No.: 13/237,640

(22) Filed: Sep. 20, 2011

(51) Int. Cl.
    *H04W 4/00* (2009.01)
(52) U.S. Cl.
    USPC ........................................ 455/466; 455/414.1
(58) Field of Classification Search
    USPC .......... 455/412.1, 412.2, 414.1, 414.4, 414.2, 455/417, 466, 403; 370/428, 429
    See application file for complete search history.

(56) References Cited

U.S. PATENT DOCUMENTS

| 7,181,217 | B2 | 2/2007 | Kalavade |
| 7,319,880 | B2 | 1/2008 | Sin |
| 8,295,865 | B1 * | 10/2012 | Kirchhoff et al. ............. 455/466 |
| 8,634,809 | B1 * | 1/2014 | Pfeffer ....................... 455/412.2 |
| 2006/0111131 | A1 | 5/2006 | Shin et al. |
| 2008/0293389 | A1 * | 11/2008 | Chin et al. ................. 455/414.1 |
| 2010/0304765 | A1 * | 12/2010 | Bhatt et al. .................... 455/466 |
| 2011/0142211 | A1 | 6/2011 | Maes |
| 2012/0014382 | A1 * | 1/2012 | Lazzaro et al. ............... 370/352 |
| 2012/0155622 | A1 * | 6/2012 | Zetterberg ................. 379/88.14 |
| 2014/0057610 | A1 * | 2/2014 | Olincy et al. .............. 455/414.1 |

FOREIGN PATENT DOCUMENTS

GB        2413245 A    * 10/2005

OTHER PUBLICATIONS

"SMS Divert: Planet 3 Messaging," retrieved on Jul. 28, 2011. <http://www.three.com.hk/website/appmanager/three/home?>.

* cited by examiner

*Primary Examiner* — Ajit Patel (57) ABSTRACT

In forwarding a Short Messaging Service (SMS) message, a server receives the SMS message addressed to a mobile device of an intended recipient. The server sends the received SMS message to the intended recipient's mobile device. The server also determines whether or not the received SMS message is to be forwarded to a network connected terminal device other than the recipient's mobile device. If so, the server sends a copy of the SMS message toward the other network connected terminal device through a network, if necessary, changing the protocol to enable the other network connected terminal device to display the SMS message. The server may send the SMS message through the network directly to the other network or through an intermediary that determines the other network connected terminal device and subsequently sends the SMS message to the other network connected terminal device.

21 Claims, 8 Drawing Sheets

| User ID | MDN | | Forwarding Service | Destination | Device Type |
|---|---|---|---|---|---|
| 0001234 | 202-999-XXXX | | Y | 10.255.67.AAA | IPTV |
| 0001235 | 212-888-YYYY | | N | | |
| 0001236 | 201-777-ZZZZ | | Y | 12.2.678.BBB | eBook |

FIG. 4A

| User ID | MDN | | Forwarding Service | Destination |
|---|---|---|---|---|
| 0002234 | 202-999-XXX0 | | Y | 2001:0db8:bd05:01d2:28 8a:1fc0:0001:XXXX |
| 0002235 | 212-888-YYY0 | | N | |
| 0002236 | 201-777-ZZZ0 | | Y | 2001:0cb8:bd04:01d2:25 8a:1fc0:0003:YYYY |

| User ID | MDN | | Forwarding Service | Destination |
|---|---|---|---|---|
| 0001234 | 202-999-XXXX | | Y | 10.255.67.AAA |
| 0001235 | 212-888-YYYY | | N | |
| 0001236 | 202-999-KKKK | | Y | 10.255.67.AAA |
| 0001237 | 201-777-ZZZZ | | Y | 12.2.678.BBB |

FIG. 7A

| User ID | MDN | | Forwarding Service | Destination |
|---|---|---|---|---|
| 0002234 | 202-999-XXX0 | | Y | Cable A |
| 0002235 | 212-888-YYY0 | | N | |
| 0002236 | 202-999-KKK0 | | Y | Cable A |
| 0002237 | 201-777-ZZZ0 | | Y | Cable B |

FIG. 7B

| User Account | Cable ID | | Forwarding Service | MDN |
|---|---|---|---|---|
| 0990985 | A01231231XX | | Y | 202-999-XXXX |
| 0990986 | A01231456YY | | N | 212-888-YYYY |
| 0990987 | B04561231ZZ | | Y | 201-777-ZZZZ |

FIG. 8

| User ID | MDN | | Forwarding Service | Destination |
|---|---|---|---|---|
| 0003231 | 202-999-XXXX | | Y | 10.255.67.AAA |
| 0003232 | 313-888-YYY1 | | Y | Cable B |
| 0003233 | 212-888-YYY2 | | N | |
| 0003234 | 212-888-YYY3 | | Y | Cable A |
| 0003235 | 212-888-YYY4 | | Y | Cable A |
| 0003236 | 201-777-ZZZZ | | Y | 12.2.678.BBB |

FIG. 9

FORWARDING A MESSAGE TO A NETWORK DEVICE

TECHNICAL FIELD

The present disclosure relates to a method and a system for forwarding a text message, for example, a short messaging service (SMS) message to a network connected terminal device. More particularly, the present disclosure relates to a method or a system in which a server forwards an SMS message to a network connected terminal device other than a mobile device.

BACKGROUND

A short messaging service (SMS) has become a popular method for communication because of its easiness of use and low cost. SMS is a text messaging service using a standardized communications protocol that allows exchange of short text messages between fixed line or mobile phone devices. Most SMS messages are mobile-to-mobile text messages.

A message from a sender is sent to a Short Messaging Service Center (SMSC) which "stores and forwards" the message to a recipient. Some SMSCs may "forward and forget" the message. Message delivery is not always guaranteed, and the sender is often not informed of successful delivery.

When a mobile phone of the recipient is turned off or is in an area not accessible to the mobile phone network, the SMS message is not viewed by the recipient. Even if the recipient's mobile phone is turned on and the SMS message is delivered to the mobile phone, the delivered message is not necessarily read by the recipient soon. For example, if parents are watching TV in a family room and their son sends an SMS message saying he will be coming home late today, it is possible that the parents would not see the mobile phone ringing/vibrating in a kitchen while watching TV, and miss the SMS message for at least some period of time.

Today, it is possible to forward a delivered SMS message to a specific email address designated by a user. However, the message forwarding function is set on, and local to, the mobile phone, and if the mobile phone is not turned on, no message is forwarded. In addition, to receive the forwarded SMS message to the email address, the recipient has to turn on, for example, a PC to read the forwarded SMS message. Again, the intended recipient may not notice and review the message for some time.

Accordingly, there is a need for providing a method or a system that enables an SMS message to be forwarded to any device connected to a network by a server in a "push" manner.

SUMMARY

The present disclosure provides a network based forwarding method and system to allow an SMS message to be forwarded to a device connected to a network. The present disclosure addresses one or more of the aforementioned problems, and provides a method or a system in which an SMS message is forwarded by a server to any network connected terminal device other than a mobile phone.

In one example, a method for forwarding a Short Message Service (SMS) message includes steps performed by a server system. The server system includes a Short Messaging Service Center (SMSC) server as a first server. The first server receives an SMS message addressed to a mobile device of a recipient. The first server sends the received SMS message from the first server through a mobile communication network toward the recipient's mobile device. The server also determines whether the received SMS message is to be forwarded to a network connected terminal device other than the recipient's mobile phone. Upon determining that the received SMS message is to be forwarded to the network connected terminal device, the first server sends a copy of the SMS message through a network toward the network connected terminal device.

The step of the first server determining whether the received SMS message is to be forwarded to a network connected terminal device other than the recipient's mobile device may include the following steps. The first server acquires, from the SMS message, recipient information regarding the recipient of the SMS message, searches a database by using the recipient information if the database indicates that an SMS message addressed to the recipient is to be forwarded to the network connected terminal device, and obtains device information of the network connected terminal device from the database upon determining that the server is to forward the SMS message toward the network connected terminal device. The server sends the copy of the SMS message by using the obtained device information.

In any of the above methods, the recipient information is a mobile phone number of the recipient's mobile phone and the device information is an IP address of the network connected terminal device. No mobile phone number may be assigned to the network connected terminal device. The network connected terminal device may include or connect to a display device for displaying the forwarded SMS message.

In any of the above methods, after determining that the SMS message is to be forwarded to the network connected terminal device and before sending a copy of the SMS message toward the network connected terminal device, the first server may determine whether a protocol of the SMS message and a protocol for the network connected terminal device to receive messages are different. Upon determining that the protocol of the SMS message and the protocol for the network connected terminal device are different, the server may change the protocol of the SMS message to a protocol for the network connected terminal device to receive the SMS message before sending the SMS message to the network connected terminal device.

Any of the above methods may further include a step of sending by the first server a notification to a sender of the SMS message. The notification indicates that the SMS message has been forwarded to the network connected terminal device.

In any of the above methods, before sending a copy of the SMS message, the first server may determine whether an acknowledgement notification has been received from the recipient's mobile device. The acknowledgement notification indicates that the SMS message has been successfully delivered to the recipient's mobile device. When the first server determines that an acknowledgement notification has not been received, the first server may send the copy of the SMS message toward the network connected terminal device.

In another example, the server system may further include a second server. In this example, in the step of sending a copy of the SMS message, the first server sends the copy of the SMS message to the second server. The second server performs the following steps. Upon receiving the copy of the SMS message, the second server obtains destination information of the network connected terminal device. Then, the second server sends the copy of the SMS message to the network connected terminal device by using the destination information.

The step of the first server determining whether the received SMS message is to be forwarded to a network connected terminal device other than the recipient's mobile device may include the following steps. The first server acquires recipient information regarding the recipient of the SMS message from the SMS message, searches a database by using the recipient information if the database indicates that an SMS message addressed to the recipient is forwarded to a destination other than the recipient's mobile device, and obtains server information of the second server upon determining that the SMS message is to be forwarded. The first server sends the copy of the SMS message by using the obtained server information. The first server may not store or acquire the destination information of the network connected terminal device.

In any of the above methods, the recipient information is a mobile phone number of the recipient's mobile phone and the server information is an IP address of the second server.

In any of the above methods, after determining to forward the received SMS message to the destination and before sending the SMS message to the second server, the first server determines whether a protocol of the SMS message and a protocol for the second server to receive messages are different. Upon determining that the protocol of the SMS message and the protocol for the second server are different, the first server changes the protocol of the SMS message to a protocol for the second server to receive the SMS message.

Any of the above methods may further include a step of the first server sending a notification to a sender of the SMS message. The notification indicates that the SMS message has been forwarded to the destination.

In any of the above methods, the second server sends the copy of the SMS message through a cable TV network. In this case, the step of the second server obtaining destination information may include the following steps. The second server acquires recipient information regarding the recipient of the SMS message from the copy of the SMS message sent from the first server, and obtains cable identification information indicating a cable corresponding to the network connected terminal device by using the acquired recipient information. The second server sends the copy of the SMS message by using the obtained cable identification information.

In any of the above methods, the network connected terminal device may include or connect to a display device for displaying the forwarded SMS message. In this example, the display device does not necessarily have an IP address.

In another example, an apparatus, for example a server, is configured to realize the functions in the aforementioned methods. The server system includes a processor, a network interface for communicating between the server and a network and a non-transitory storage system storing a database and a program executed by the processor. The non-transitory storage system may include, but is not limited to, a hard disk drive (HDD), any types of optical disks, magnetic tapes or EEPROM.

The program, when executed by the processor, causes the server to execute the following functions. The server receives an SMS message addressed to a mobile device of a recipient, sends the received SMS message to the recipient's mobile device, and determines whether or not the received SMS message is to be forwarded to a network connected terminal device other than the recipient's mobile device. Upon determining that the received SMS message is to be forwarded to the network connected terminal device, the server copies the received SMS message and sends the copy of the SMS message toward the network connected terminal device.

In the function to determine whether or not the received SMS message is to be forwarded to a network connected terminal device other than the recipient's mobile phone includes the following functions. The server acquires, from the SMS message, recipient information regarding the recipient of the SMS message, searches the database by using the recipient information to determine if the database indicates that an SMS message addressed to the recipient is to be forwarded to the network connected terminal device, and obtains device information of the network connected terminal device from the database upon determining that the SMS message is to be forwarded toward the network connected terminal device. The server sends the copy of the SMS message by using the obtained device information. No mobile phone number is assigned to the network connected terminal device.

In any of the above servers, the recipient information is a mobile phone number of the recipient's mobile phone and the device information is an IP address of the network connected terminal device.

After determining that the SMS message is to be forwarded to the network connected terminal device and before sending the SMS message to the network connected terminal device, the server may determine whether a protocol of the SMS message and a protocol for the network connected terminal device to receive messages are different. Upon determining that the protocols of the SMS message and network connected terminal device are different, the server may change the protocol of the SMS message to a protocol for the network connected terminal device to receive the SMS message.

In any of the above servers, the program may further cause the server to execute a function to send a notification to a sender of the SMS message. The notification indicates that the SMS message has been forwarded to the network connected terminal device.

In any of the above servers, the program may further cause the server to execute the following functions. Before sending a copy of the SMS message, the server determines whether an acknowledgement notification has been received from the recipient's mobile device. The acknowledgement notification indicates that the SMS message has been successfully delivered to the recipient's mobile device. Upon determining an acknowledgement notification has not been received, the server sends the copy of the SMS message toward the network connected terminal device.

The method and the apparatus of the present disclosure, together with further objects and advantages, can be better understood by reference to the following detailed description and the accompanying drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

At a high-level, a method for forwarding a Short Message Service (SMS) message includes steps performed by a server. The server receives an SMS message addressed to a mobile device (such as a mobile phone) of a recipient. The server sends the received SMS message to the recipient's mobile phone. The server also determines whether or not the received SMS message is to be forwarded to a network connected terminal device other than the recipient's mobile phone. Upon determining to forward the received SMS message to the network connected terminal device other than the recipient's mobile phone, the server copies the received SMS message and sends a copy of the SMS message toward the network connected terminal device, directly or indirectly. Several examples of systems and methods for implementing the SMS message forwarding are discussed with reference to the drawings.

EXAMPLE 1

Figure 1:
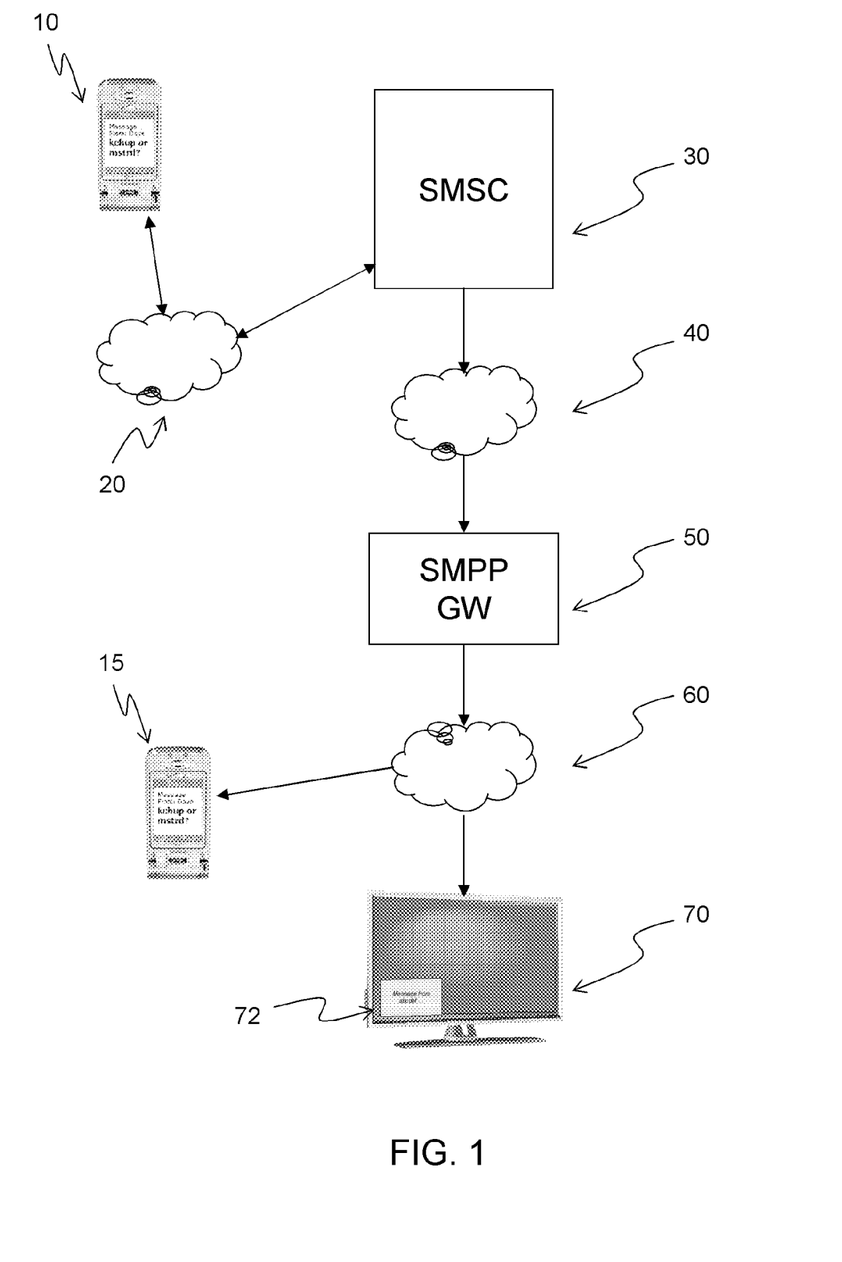
FIG. 1 shows an exemplary overall system offering SMS message forwarding services.
Figure 2:
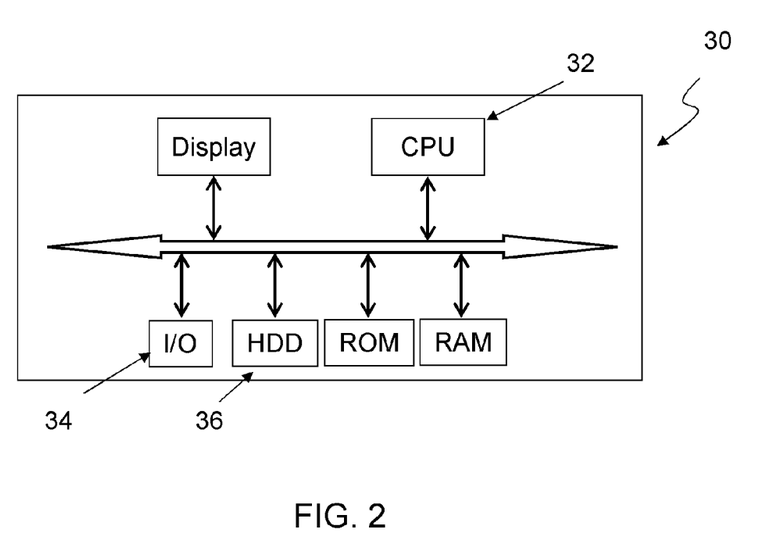
FIG. 2 shows an exemplary server configuration, which may be used as any of the servers in the system of FIG. 1.
Figure 3:
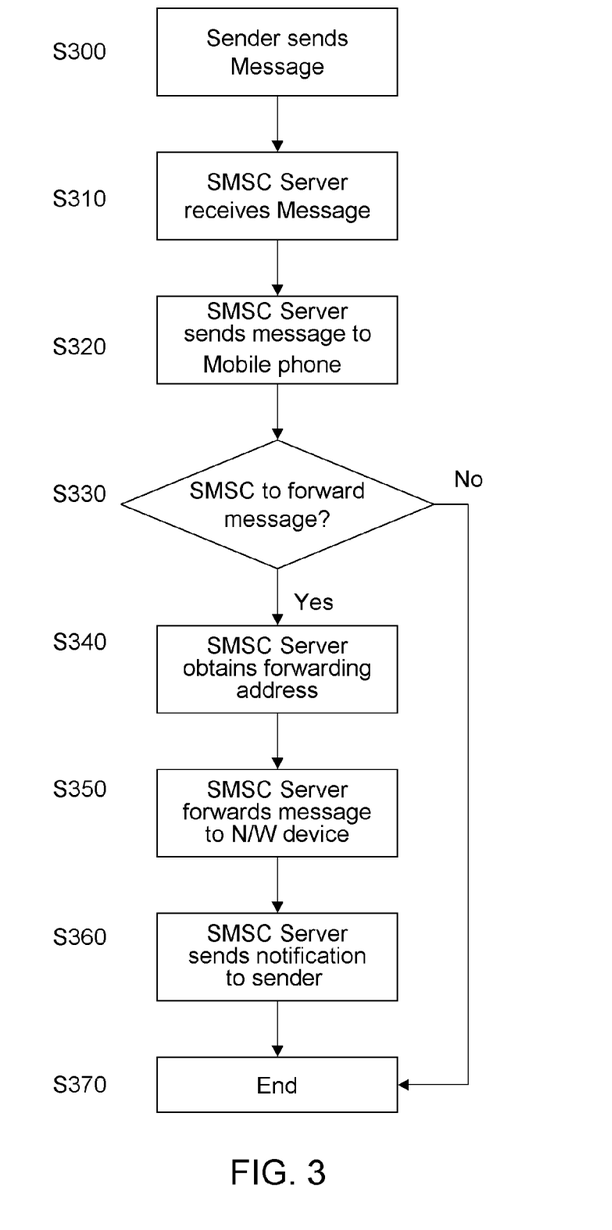
FIG. 3 shows an exemplary flow of the SMS message forwarding services in the system of FIG. 1.

FIG. 1 shows an exemplary overall system supporting SMS message forwarding services, FIG. 2 shows an exemplary server diagram used in the services of FIG. 1, and FIG. 3 shows an exemplary flow of the SMS message forwarding services as implemented by the system of FIG. 1.

Users who wish to utilize the SMS message forwarding service provided by this system register as subscribers in the system. It is noted that intended recipients of the forwarded message are generally subscribers. When registering in the system, the users provide their individual information. This information includes, but is not limited to, a mobile device identifier such as a mobile directory number (MDN) (or a mobile phone number) and information about a network connected terminal device (network device) to which the users wish to have SMS messages forwarded. Examples of the network device include an IP-TV, an electronic book reader and a network connectable game console and any device connectable to a network. The information about the network device includes, for example, but is not limited to, an IP (internet protocol) address of the network device, a type of the network device and functionalities of the network device (network protocols or data receiving protocol).

If the users know the IP address of the network device upon registration, the user can provide the IP address to a service provider of the SMS message forwarding service (generally, a mobile phone service carrier). The SMS message forwarding service provider stores the IP address in a database with a relationship to, for example, the users' identification information (e.g., an account number) and/or an MDN.

If the users do not know the IP address, the users may provide identification information of their network device with which the users wish to receive the forwarded message. An example of such identification information of the network device is a serial number of the network device. The SMS message forwarding service provider may obtain the IP address of the users' network device from the manufacturer of the network device and/or from a carrier providing communication service to the network device, based on the serial number.

In the example of FIG. 1, a sender uses his or her mobile phone 10 to send an SMS message for the user of a mobile phone 15. A mobile/wireless communication network 20 provides communication service to the mobile phone 10. The mobile phone 15 obtains wireless communication service from a mobile communication network 60. Although shown as separate networks, at any given time, the mobile phones 10 and 15 may be served by the same network or by different networks. It is noted that the sender is not necessarily a subscriber of this SMS message forwarding service.

The system for providing SMS message forwarding service includes a main server 30, which is, for example, a short message service center (SMSC) server. The SMSC server 30 includes, among other features, a CPU 32, a network interface (I/O) 34, and a storage device 36, for example, one or more hard disk drives (GDD), as shown in FIG. 2. The SMSC server 30 is configured to be connected to, for example, a wireless network and a packet data network such as an intranet or the Internet. The storage device 36 stores an application program, which, when executed by the CPU 32, causes the SMSC server 30 to perform an SMS message forwarding function. The SMSC server 30 also maintains a subscriber database in the storage device 36, in which user registration information is stored. Other components (as shown) such as a display or other forms of storage devices, such as RAMs and ROMs, may be present in the SMSC server 30.

This database allows the SMSC server 30 to determine whether it is necessary to forward a received SMS message to a network device other than a recipient's mobile phone. As set forth above, the subscriber database stores user information sufficient to allow the SMSC server 30 to determine whether forwarding of the received SMS message to a network device other than a recipient's mobile phone is desired. For example, for the subscriber having the forwarding service, the database stores the subscriber's MDN or other mobile device identifier and an IP address assigned to the network device to which the subscriber wishes to receive the forwarded SMS message (see, FIGS. 4A and 4B). It is noted that the subscriber may receive the forwarded SMS by two or more network devices, and in such a case, two or more IP addresses are stored in connection with the user information.

In addition, the subscriber may designate a specific time or day to activate the forwarding service. For example, the subscriber may designate that SMS messages are forwarded to the network device during the evening time (e.g., 5:00 pm to 10:00 pm), or that SMS messages are forwarded to the network device during the weekend (e.g., Saturday and Sunday) or specific days. If two or more network devices are registered as a forwarding destination, the SMS messages may be forwarded to a designated one(s) of the network devices based on the time or day. Moreover, the subscriber may designate that SMS messages sent from the specific sender are forwarded to the network device (or are not forwarded). For example, the subscriber may specify only SMS messages from family members to be forwarded. In such a case, the MDNs of the family members are stored in the database as sender information.

Further, as shown in FIG. 1, the overall service system may include an SMS peer-to-peer (SMPP) gateway 50 connected by a network 40 to/from the SMSC server 30. The SMPP gateway 50 may further connect to a network 60, for example, the Internet. The SMSC server 30 delivers SMS messages by using a SMPP (Short Message peer-to-peer) protocol. The SMPP gateway (GW) 50 may change protocols of the messages. The network device 70 can bind to The SMPP GW 50 by using the SMPP protocol and wait for new messages. The SMSC server 30 delivers the SMS message to network device 70 if a new SMS message arrives for this device 70.

The SMS message forwarding function by the SMSC server 30 works as follows.

First, a sender creates a text message (i.e., an SMS message) on his/her mobile phone 10 (or other device) and attempts to send the SMS message to a recipient's mobile phone 15 through a wireless network 20 (step S300 of FIG. 3). The sent SMS message includes at least a message body and the recipient's MDN (or other identifier) as the destination address.

When the SMSC server 30 receives the sent SMS message from the wireless network 20 (step S310), the SMSC server 30 stores and forwards the received SMS message to the recipient's mobile phone 15 by using known SMS protocols and procedures (step S320). The SMSC server 30 may store the received SMS message after forwarding the SMS message to the network device, or may delete the received SMS message after forwarding the SMS message to the network device. The SMS message is forwarded from the SMSC server 30, as shown in FIG. 1, through an SMPP network 40 and a network 60 and an SMPP gateway 50, and over the air to mobile phone 15.

Next, the SMSC server 30 searches a database to determine whether the received SMS should be forwarded to a device other than the recipient's mobile phone (step S330). In this step, the SMSC server 30 searches the database by using the recipient's MDN. If an entry of the database corresponding to the recipient's MDN indicates that an SMS message should be forwarded (for example, a flag is assigned to the entry), the SMSC server 30 determines that the SMS message is to be forwarded, and obtains an IP address of the network device as device information from the database (step S340).

Figure 4A:
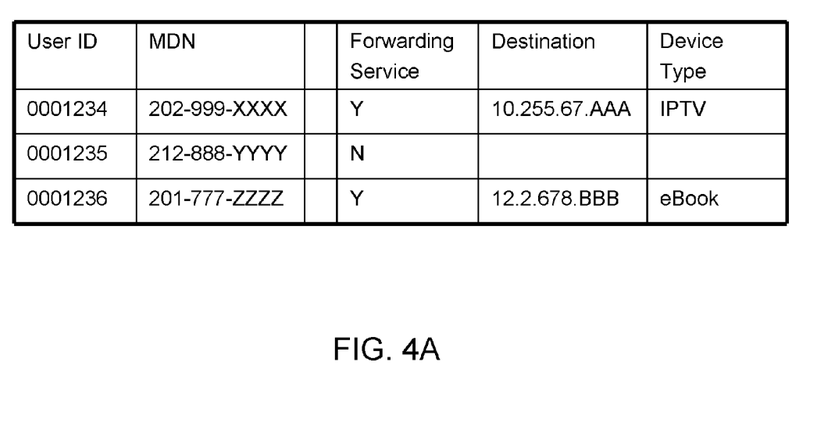
FIGS. 4A and 4B show exemplary entries of a database used in the SMS message forwarding system of FIG. 1.
Figure 4B:
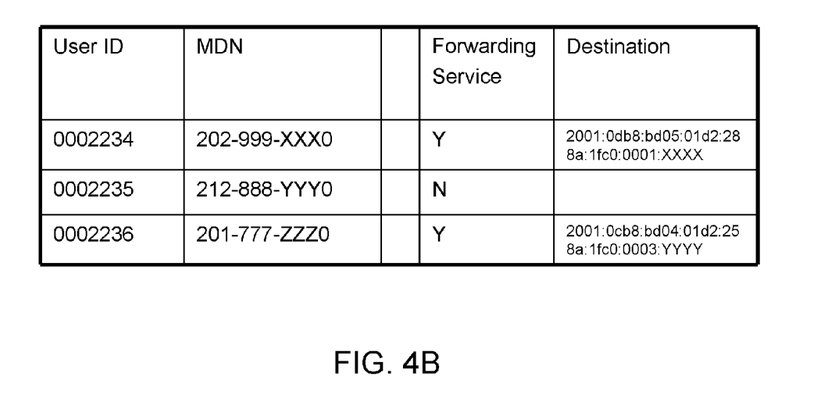

FIGS. 4A and 4B show exemplary entries of the database. In FIG. 4A, the entry designates the IP address of the network device as in IPv4 format, and in FIG. 4B, the entry designates the IP address of the network device as in IPv6 format.

The SMSC server 30 then copies the received SMS message (or reads the stored SMS message), and sends a copy of the SMS message to the IP address of the network device (step S350). In some cases, the SMS message may be translated into a different type of message. In such a case, for example, the protocol of the copy of the SMS message may be translated from the SMS protocol to a protocol that enables the network device to recognize the SMS message. The SMSC server 30 may change the protocol dependent on the type of the network device. The SMSC server 30 may use SMPP protocols or IP protocols as required by the network device.

With the foregoing steps, the SMS message is forwarded to a network device by the server, e.g., an SMSC server, that receives the SMS message and transmits the SMS message to the recipient's mobile phone 15. Thus, forwarding of the SMS message does not rely on the status of the recipient's mobile phone 15 and is accomplished in a "push" manner by the SMSC server's forwarding functionality. The SMS message is not only delivered to the recipient's mobile phone 15 but is copied and forwarded to the network device.

Examples of various network devices that may be the recipient of the forwarded SMS message include, but are not limited to, IP-TV 70, an electronic book reader or a network connectable game console each of to which an IP address is assigned. The IP address may be IPv4 or IPv6. It is noted that in the example the network device does not have any MDN or other type of mobile network number. Even if an MDN is assigned to the network device, such an MDN may not be utilized as the device information for the SMSC server 30 to forward the copy of the SMS message to the terminal device.

When the SMSC server 30 forwards the SMS message to the network device (e.g., IPTV 70), the SMSC server may send a notification of forwarding to the sender's mobile phone (step S360). The notification indicates that the SMS message sent by the sender has been forwarded to a network device. The notification may include an identification of the network device (e.g., the type such as TV or a personal identifier such as "family room TV").

In step S330, the SMSC server 30 may determine that it is not necessary to forward the received SMS message. For example, the SMSC server 30 does not find any entry corresponding to the recipient's MDN in the database, or even though the SMSC server 30 finds the entry corresponding to the recipient's MDN in the database, the entry may indicate that the forwarding service is temporarily not necessary (i.e., a flag indicates temporary disablement of the service). Such temporary disablement of the forwarding service may be requested by a user, or may be requested by the SMS message forwarding service provider for any of a variety of reasons (e.g., non-payment of a forwarding service subscription fee). If the user wishes to have the SMS messages not forwarded during a specific time period (e.g., midnight-8 a.m.), the user may designate such a time period to disable the forwarding service. The user can provide more than one network device to which copies of the SMS message are to be forwarded. If multiple network devices are provided and registered, different priorities can be set for at least some of the network devices. This allows the SMSC server 30 to attempt delivery of a copy of the message dependent on the network device priority and terminate further, lower priority deliveries if a copy is delivered to any of the network devices. Successful delivery may be determined by receipt at the SMSC server 30 of an acknowledgement message by the network device that has received the copy. A user may also define specific MDNs (such as those of a family member) for these messages to be forwarded and all other messages not to be forwarded. If the SMSC server 30 determines that it is not necessary to forward the received SMS in step S330, the program ends (step S370).

In addition, the SMSC server 30 may forward the received SMS message when the SMS message has not successfully been delivered to the mobile phone 15 of the intended recipient. When a mobile phone receives an SMS message, the mobile phone can send an acknowledgment of receipt back to an SMSC server. The SMSC server 30 can monitor whether such an acknowledgment has been received, for example, within a predetermined amount of time (e.g., one hour). If the acknowledgment has not been received within the predetermined amount of time, the SMSC server 30 determines that the SMS message is to be forwarded to the network device other than the recipient's mobile phone, and performs the forwarding functions as set forth above. In another example, the SMSC server 30 can determine that the SMS message is to be forwarded to the network device when the SMSC server 30 has repeatedly attempted to deliver the SMS message to the mobile phone 15 but failed to successfully deliver the SMS message within predetermined times (i.e., not receiving an acknowledgement).

When the SMS message is forwarded, the network device, for example, IPTV 70, receives the forwarded SMS message. The IPTV 70 then displays the received SMS message 72 on the screen by, for example, superimposing the SMS message or notification of the arrival of the SMS message (for activation) on the current TV program. An application program used to display the SMS message may be pre-installed in or downloaded to the IPTV 70 at any point prior to display of the SMS message. Such an application program may be provided by the SMS message forwarding service provider via a network or a tangible medium. The application program can control manners or formats of the displayed SMS messages, such as font, type size, placement, color, background color, etc. The user may set these variables or may use automatic settings.

In the above example, step S320 for sending a text message as an SMS message to the intended recipient's mobile phone may be performed after or at the same time of any of steps S330-S360.

The user of the SMS message forwarding services can change information stored in the database via, for example, a website provided by the SMS message forwarding service provider. For example, the user can add a new network device to or remove a network device from the database. The user may also temporarily suspend the forwarding service or activate the suspended forwarding service.

EXAMPLE 2

Figure 5:
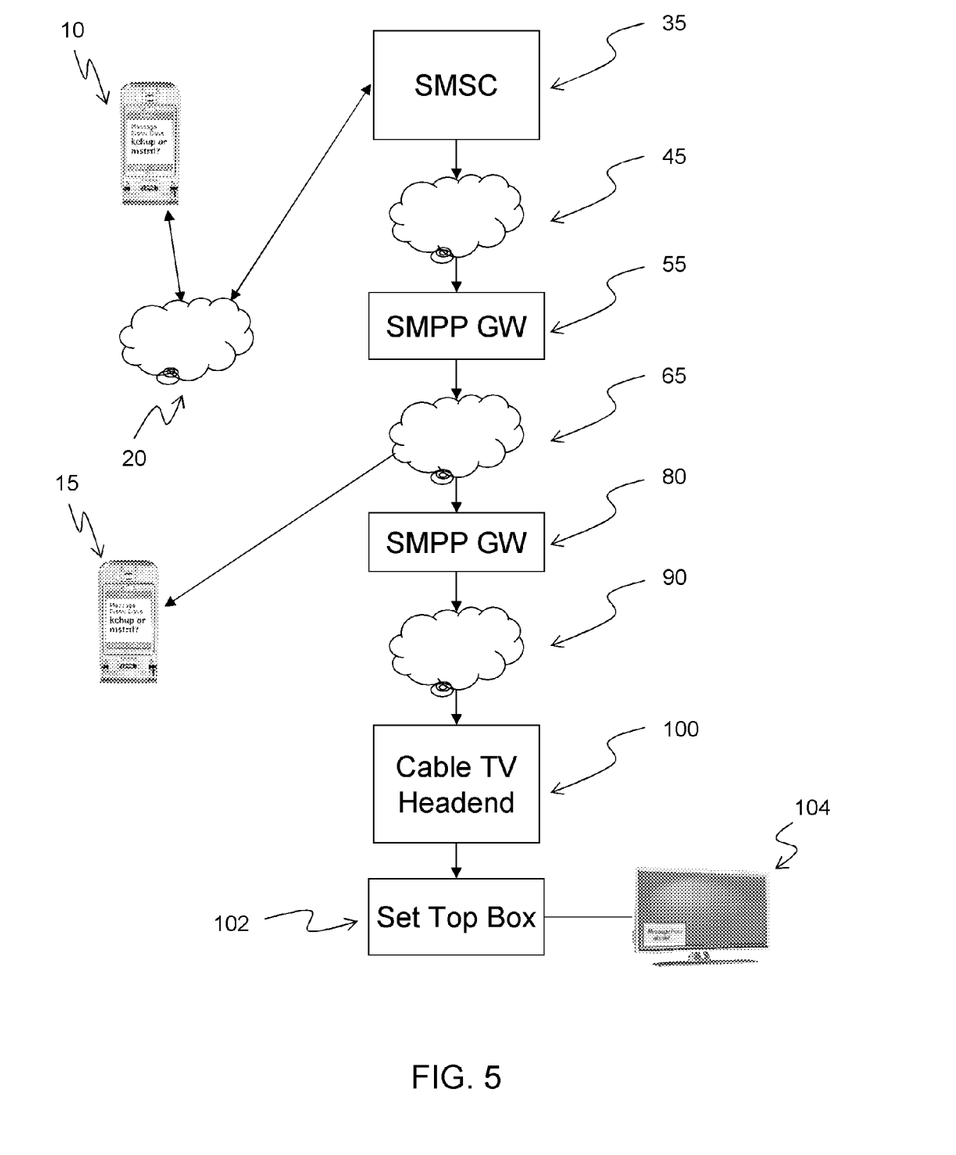
FIG. 5 shows another exemplary overall system offering SMS message forwarding services.
Figure 6:
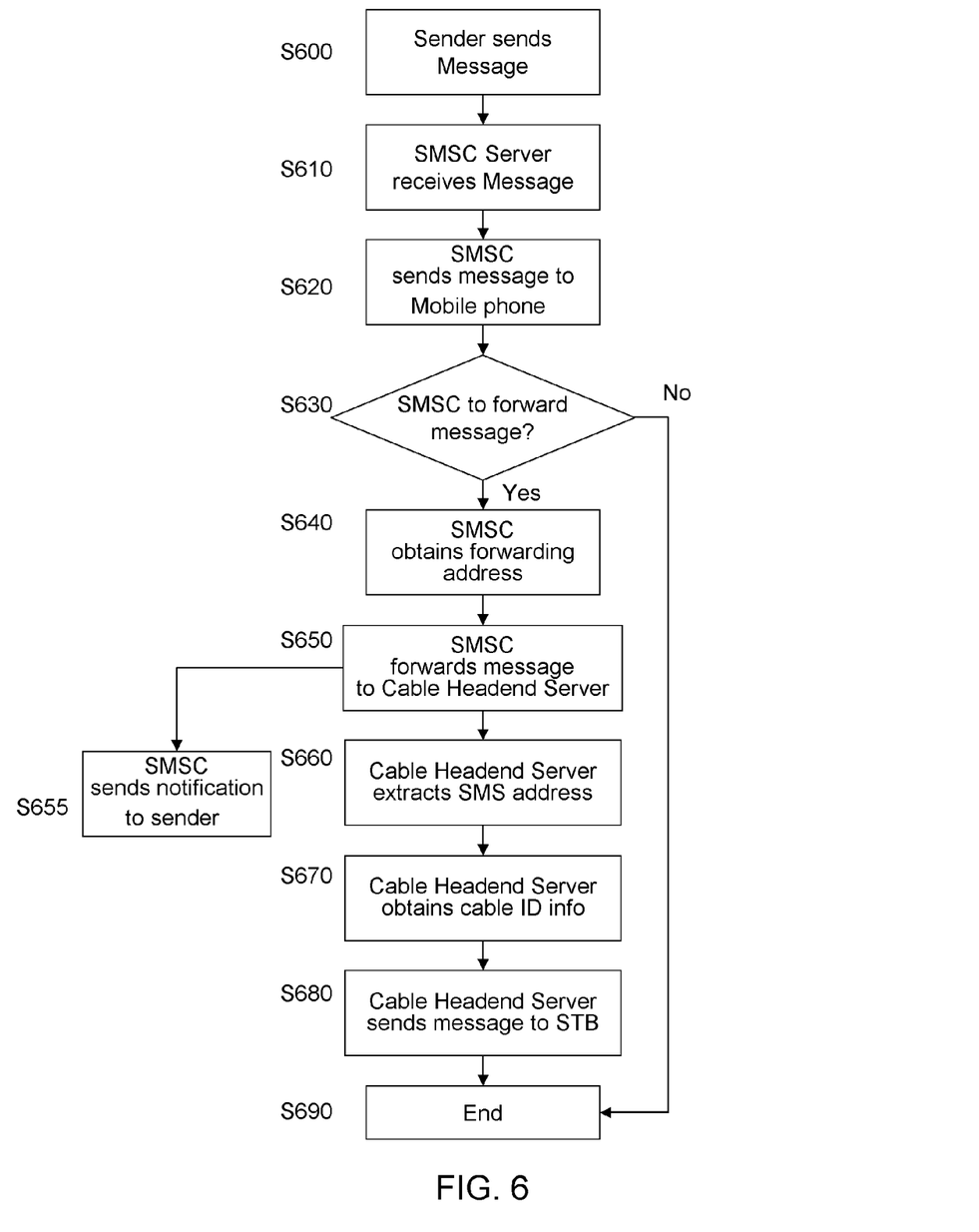
FIG. 6 shows an exemplary flow of the SMS message forwarding services in the system of FIG. 5.

FIG. 5 shows another exemplary overall system supporting SMS message forwarding services, and FIG. 6 shows an exemplary flow of the SMS message forwarding services via the system of FIG. 5.

One of the differences from Example 1 is that the SMS message is not directly forwarded by the SMSC server to a network device. Instead, the SMS message is once forwarded to an intermediate server of another entity different from the SMS message forwarding service provider (i.e., mobile phone service carrier) and the intermediate server of such an entity further delivers the forwarded SMS message to the intended recipient. In this example, users are not only subscribers of the SMS message forwarding services but also subscribers of services provided by the entity, for example, cable TV services provided by a cable TV service provider.

If a user who wishes to subscribe the SMS message forwarding services has already been a subscriber of the cable TV services, the user can provide information about the cable TV services upon registration to the SMS message forwarding services. The information specifies the user and the cable TV service provider. For example, the user can simply provide with the name of the cable TV service provider together with the users' address or phone number, or the user can provide with the user ID or account information of the cable TV services. If the cable TV service provider has an agreement with the SMS message forwarding service provider (e.g., mobile phone service carrier) regarding the SMS message forwarding services, the SMS message forwarding service provider notifies the cable TV service provider of the new subscription of the user. At the same time, the SMS message forwarding service provider stores the user information in the database together with information about the cable TV service provider. The information about the cable TV service provider may be a name of the cable TV service provider, an ID (identification) code for the cable TV service provider or a specific server address (i.e., IP address) of a server in the cable TV service provider. By the foregoing procedures, the entry in the database about this user now indicates that an SMS message is to be forwarded to the cable TV service provider.

On the other hand, if a user has already been a subscriber of cable TV services provided by a cable TV service provider, the user can sign-up the SMS message forwarding services via the cable TV service provider. In such a case, the user can provide information about the mobile phone information, for example, the MDN or other identification information of the mobile phone. The cable TV service provider notifies the MDN or the identification information together with other user information to the SMS message forwarding service provider. The SMS message forwarding service provider stores the user information to the database together with information about the cable TV service provider. By the foregoing procedures, the entry in the database about this user now indicates that an SMS message is to be forwarded to the cable TV service provider.

Similarly, if a user is a subscriber of neither the cable TV service provider nor the SMS message forwarding service provider, the user can become a subscriber of the SMS message forwarding service through the cable TV service provider or the SMS message forwarding service provider according to the agreement between the cable TV service provider and the SMS message forwarding service provider. If a user is a subscriber of both the cable TV service provider and the SMS message forwarding service provider, the user can subscribe to the SMS message forwarding service through either service provider. Thus, if a user is a subscriber of one, but not both, of the providers, the user may be able to subscribe to the SMS message forwarding service through whichever of the providers the user is a subscriber (as long as an agreement exists between the two providers).

Once the user has become the subscribers of both cable TV services and the SMS message forwarding services, the SMS message forwarding services work as follows.

First, a sender creates a text message (i.e., an SMS message) on his/her mobile phone 10 and attempts to send the SMS message to a recipient's mobile phone 15 through a wireless network 20 (step S600 of FIG. 6). The sent SMS includes at least the message body and the recipient's MDN as the destination address.

When the SMSC server 35 receives the sent SMS message, the SMSC server 35 stores and forwards the received SMS message to the recipient's mobile phone 15 by using known SMS protocols and procedures (step S620). The SMS message is sent, for example, from SMSC server 35 through SMS Point-to-Point (SMPP) networks 45 and 65 and SMPP gateway 55, and from SMPP network 65 over the air to mobile phone 15.

Next, the SMSC server 35 searches a database to determine whether the received SMS message should be forwarded to a device other than the recipient's mobile phone (step S630). In this step, the SMSC server 35 searches the database by using the recipient's MDN. If an entry of the database corresponding to the recipient's MDN indicates that an SMS message should be forwarded (for example, a flag is assigned to the entry), the SMSC server 35 determines that the SMS message is to be forwarded.

Figure 7A:
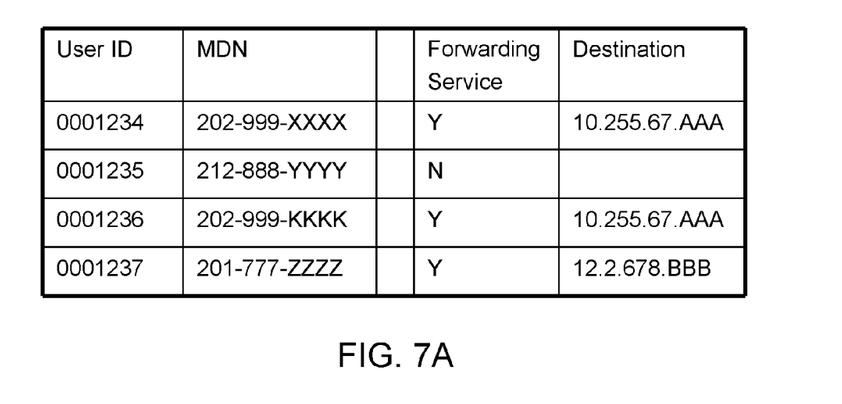
FIGS. 7A and 7B show exemplary entries of a database used in the SMS message forwarding system of FIG. 5.
Figure 7B:
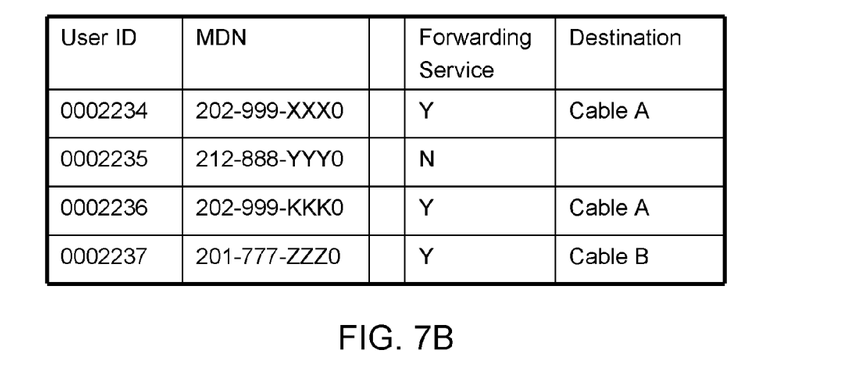

When the SMSC server 35 determines that the SMS message is to be forwarded, the SMSC server 35 obtains information from the database about a destination to which the SMS message should be forwarded (step S640). For example, the SMSC server 35 obtains an IP address of the server in the cable TV service provider. The entry of the database may directly indicate the IP address of the server in the cable TV service provider, or may simply indicate a name or ID of the cable TV service provider. FIGS. 7A and 7B show examples of the entries of the database. In FIG. 7A, the entry designates the IP address of the server in the cable TV service provider, and in FIG. 7B, the entry designates the cable TV service provider's name. If the name or ID is designated in the entry of the database, the SMSC server separately obtains the corresponding IP address of a server of each cable TV service provider by using, for example, another database or table indicating the correspondence between the name or ID and the IP address.

After the SMSC server 35 obtained the destination information (i.e., the IP address of the server in the cable TV service provider), the SMSC server 35 forwards the SMS message to the server in the cable TV service provider (step S650). The SMSC server 35, after determining that the SMS message is to be forwarded to the server of the cable TV service provider from the database, then determines from the database whether the protocol used by the server of the cable TV service provider is different from that of the SMS message. If the SMSC server 35 determines that the protocols are different, the SMSC server 35 changes the protocol of the SMS message to a proper protocol for the server of the cable TV service provider to receive the SMS message. A communication between the SMS message forwarding service provider (i.e., mobile phone service carrier) and the cable TV service provider includes networks 65 and 90 which may include a gateway 80. Typically, the network includes the Internet.

When the SMSC server 35 forwards the SMS message to the server in the cable TV service provider, the SMSC server 35 may send a notification of forwarding to the sender's mobile phone (step S655). The notification indicates that the SMS message sent by the sender has been forwarded to a network device other than the recipient's mobile phone (and may identify the other device, e.g., by IP address or personal identifier).

In the cable TV service provider, the server that receives the SMS message may be a cable TV headend server 100. The cable television headend server 100 is a master apparatus for receiving television signals for processing and for distributing TV programs over a cable TV system. Once the headend server 100 receives the forwarded SMS message, the headend server 100 obtains the recipient's MDN included in the SMS message (step S660). Then, the headend server 100 searches a database in the headend server 100 to obtain cable identification information (step S670) as destination information.

Figure 8:
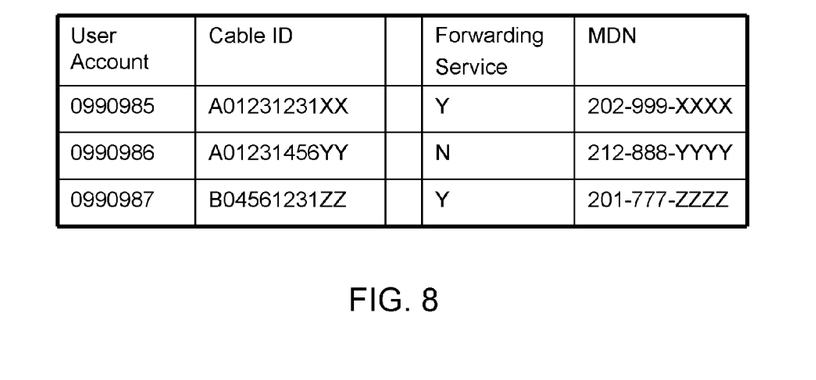
FIG. 8 shows exemplary entries of a database used in the SMS message forwarding system of FIG. 5.

FIG. 8 shows examples of entries of the database of the headend server 100. By using the MDN obtained from the SMS message, the headend sever 100 obtains a corresponding cable ID. The cable ID indicates a physical cable connected to the subscriber's home or office. At the end of the physical cable, a set-top-box or a TV is connected.

After the headend server 100 obtained the cable ID, the headend server 100 sends the SMS message through the corresponding cable link (step S680). The headend server 100 also determines from its database whether the protocols of the received message and that of the receiving device are different. If the headend server 100 determines that the protocol is to be changed, the headend server 100 changes the protocol of the SMS message to an appropriate protocol for delivering information through the cable to the receiving device.

The forwarded SMS message sent from the headend server 100 is received by a set-top-box 102 installed in the recipient's home or office. Then, the set-top-box 102 displays the SMS message on a screen of TV 104. An application program used to display the SMS message on TV 104 is, as above, pre-installed in the set-top-box 102. Such an application program may be provided by the SMS message forwarding service provider or the cable TV service provider via a network or a tangible medium. As described previously, the application program can control manners or formats of the displayed SMS messages on the TV 104. Functions of the set-top-box may be incorporated into the TV 104.

If some identification number is assigned to the set-top-box 102 and the cable headend 100 can send the SMS message by using the identification number of the set-top-box 102, the cable headend 100 can use such identification number as destination information.

If the SMSC server 35 determines that it is not to forward the received SMS in step S630, the program end (step S690).

In the above example, step S620 may be performed after or at the same time of any of steps S630-S655.

In the above example, the headend server 100 may include one or more servers. If the headend server 100 includes two or more servers, one of them may be utilized for forwarding the SMS message and the others may be utilized for the regular cable TV services.

The user of the SMS message forwarding services can change information stored in the database via, for example, a website provided by the SMS message forwarding service provider or the cable TV service provider. For example, the user may temporary suspend the forwarding service or activate the suspended forwarding service.

EXAMPLE 3

Figure 9:
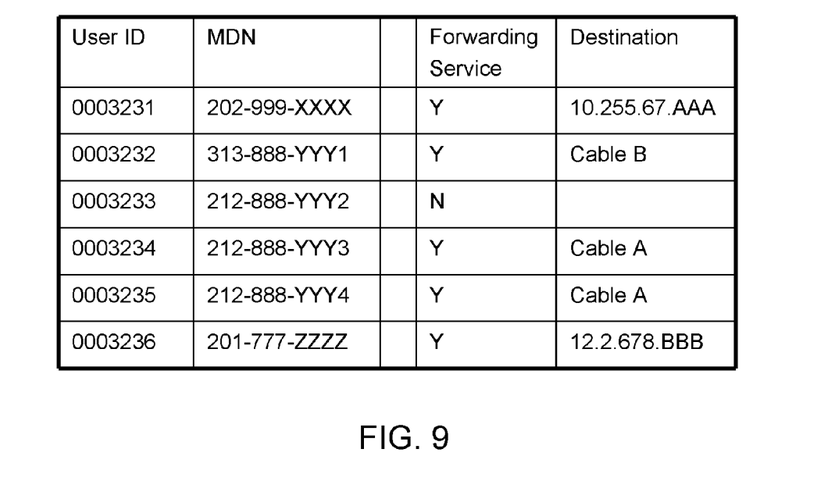
FIG. 9 shows another exemplary entries of a database used in the SMS message forwarding system.

The above Examples 1 and 2 are not exclusive and may be combined in another embodiment. In such a case, the SMSC server in the SMS message forwarding service provider (mobile phone service carrier) can utilize a database as shown in FIG. 9. If the destination of the corresponding MDN shows an IP address of a network device, the SMSC server forwards the SMS message according to the procedures as described in Example 1. If the destination of the corresponding MDN shows an entity ID, e.g., a name of cable TV service provider, the SMS message is forwarded according to the procedures as described in Example 2.

One of the advantages of the present method and system is that even if a recipient's mobile phone is turned off or is not immediately available to the recipient, it is possible for the recipient to view the forwarded SMS message on a non-mobile phone device such as on a TV screen. This provides more reliable delivery of the SMS message to the recipient.

Further, since the server performs the forwarding processes, it is not necessary for the user to install an additional application program for forwarding SMS messages on the mobile phone. In addition, it is not necessary for the user to update such an application program.

Although certain specific examples have been disclosed, it is noted that the present teachings may be embodied in other forms without departing from the spirit or essential characteristics thereof. For example, the messages to be forwarded are not limited to SMS messages, but may include any mobile-to-mobile messaging services such as Enhanced Messaging Service (EMS) message and Multimedia Messaging Service (MMS) messages. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for forwarding a Short Messaging Service (SMS) message by a server system, the server system including a Short Messaging Service Center (SMSC) server in a mobile communication network as a first server, the method comprising the first server performing steps of:
   receiving an SMS message addressed to a mobile device of a recipient;
   sending the received SMS message from the first server through the mobile communication network toward the recipient's mobile device;
   determining whether or not the received SMS message is also to be forwarded to a network connected terminal device other than the recipient's mobile device; and
   upon determining that the received SMS message is to be forwarded to the network connected terminal device, sending a copy of the SMS message through a network toward the network connected terminal device,
   wherein at least one of:
   a) the first server performs steps of at least one of:
      i) in determining whether or not the received SMS message is also to be forwarded to a network connected terminal device other than the recipient's mobile device:
         acquiring, from the SMS message, recipient information regarding the recipient of the SMS message;
         searching a database by using the recipient information to determine if the database indicates that an SMS message addressed to the recipient is also to be forwarded to the network connected terminal device; and
         obtaining device information of the network connected terminal device from the database upon determining that the SMS message is to be forwarded to the network connected terminal device, and
      the step of sending a copy of the SMS message uses the obtained device information,
      ii) after determining that the received SMS message is to be forwarded to the network connected terminal device and before sending a copy of the SMS message toward the network connected terminal device,
         determining whether a protocol of the SMS message and a protocol for the network connected terminal device to receive messages are different; and
         upon determining that the protocols of the SMS message and network connected terminal device are different, changing the protocol of the SMS message to a protocol for receipt of the SMS message by the network connected terminal device before sending the copy of the SMS message toward the network connected terminal device, or
      iii) before sending a copy of the SMS message,
         determining whether an acknowledgement notification has been received from the recipient's mobile device, the acknowledgement notification indicating that the SMS message has been successfully delivered to the recipient's mobile device; and
         upon determining that an acknowledgement notification has not been received, sending the copy of the SMS message toward the network connected terminal device; or
   b) the server system further comprises a second server,
      in the step of sending a copy of the SMS message, the first server sends the copy of the SMS message to the second server, and
      the method further comprises the second server performs steps of:
      upon receiving the copy of the SMS message, obtaining destination information of the network connected terminal device; and
      sending the copy of the SMS message to the network connector terminal device by using the destination information.

2. The method of claim 1 wherein: the step of determining whether or not the received SMS message is also to be forwarded to a network connected terminal device other than the recipient's mobile device includes the first server performing steps of:
   acquiring, from the SMS message, recipient information regarding the recipient of the SMS message;
   searching a database by using the recipient information to determine if the database indicates that an SMS message addressed to the recipient is also to be forwarded to the network connected terminal device; and obtaining device information of the network connected terminal device from the database upon determining that the SMS message is to be forwarded to the network connected terminal device, and the step of sending a copy of the SMS message uses the obtained device information.

3. The method of claim 2, wherein the recipient information is a mobile phone number of the recipient's mobile device and the device information is an IP address of the network connected terminal device.

4. The method of claim 1, further comprising the first server performing steps of:

after determining that the received SMS message is to be forwarded to the network connected terminal device and before sending a copy of the SMS message toward the network connected terminal device, determining whether a protocol of the SMS message and a protocol for the network connected terminal device to receive messages are different; and upon determining that the protocols of the SMS message and network connected terminal device are different, changing the protocol of the SMS message to a protocol for receipt of the SMS message by the network connected terminal device before sending the copy of the SMS message toward the network connected terminal device.

5. The method of claim 1, further comprising the first server performing a step of sending a notification to a sender of the SMS message, the notification indicating that the SMS message has been forwarded to the network connected terminal device.

6. The method of claim 1, wherein no mobile phone number is assigned to the connected terminal network device.

7. The method of claim 1, further comprising the first server performing steps of:

before sending a copy of the SMS message, determining whether an acknowledgement notification has been received from the recipient's mobile device, the acknowledgement notification indicating that the SMS message has been successfully delivered to the recipient's mobile device; and upon determining that an acknowledgement notification has not been received, sending the copy of the SMS message toward the network connected terminal device.

8. The method of claim 1, wherein:

the server system further comprises a second server, in the step of sending a copy of the SMS message, the first server sends the copy of the SMS message to the second server, and the method further comprises the second server performing steps of:

upon receiving the copy of the SMS message, obtaining destination information of the network connected terminal device; and sending the copy of the SMS message to the network connecter terminal device by using the destination information.

9. The method of claim 8, wherein:

the step of the first server determining whether or not the received SMS message is to be forwarded to a network connected terminal device other than the recipient's mobile device includes the first server:

acquiring recipient information regarding the recipient of the SMS message from the SMS message;

searching a database by using the recipient information to determine if the database indicates that an SMS message addressed to the recipient is to be forwarded to a destination other than the recipient's mobile device; and obtaining server information of the second server upon determining that the SMS message is to be forwarded to the destination, the step of the first server sending the copy of the SMS message uses the obtained server information, and the first server does not store or acquire the destination information of the network connected terminal device.

10. The method of claim 9, wherein the recipient information is a mobile phone number of the recipient's mobile device and the server information is an IP address of the second server.

11. The method of claim 8, further comprising the first server performing steps of:

after determining to forward the received SMS message and before sending the copy of the SMS message to the second server, determining whether a protocol of the SMS message and a protocol for the second server to receive messages are different; and upon determining that the protocol of the SMS message and the protocol for the second server are different, changing the protocol of the SMS message to a protocol for transmission of the SMS message to the second server.

12. The method of claim 8, further comprising the first server performing a step of sending a notification to a sender of the SMS message, the notification indicating that the SMS message has been forwarded to the network connected terminal device.

13. The method of claim 8, wherein the second server sends the copy of the SMS message through a cable TV network to the network connected terminal device.

14. The method of claim 13, wherein:

the step of the second server obtaining destination information includes the second server performing steps of:

acquiring recipient information regarding the recipient of the SMS message from the copy of the SMS message sent from the first server; and obtaining cable identification information indicating a cable corresponding to the network connected terminal device by using the acquired recipient information, as the destination information, and the step of the second server sending the copy of the SMS message uses the obtained cable identification information.

15. The method of claim 13, wherein the network connected terminal device includes or connects to a display device for displaying the forwarded SMS message.

16. A server, comprising:

a processor;

a network interface for communicating between the processor and a mobile communication network; and a non-transitory storage system storing a database and a program executed by the processor, wherein:

the program, when executed by the processor, causes the server to execute functions to:

receive a Short Messaging Service (SMS) message addressed to a mobile device of a recipient;

send the received SMS message from the server through the mobile communication network toward the recipient's mobile device;

determine whether or not the received SMS message is also to be forwarded to a network connected terminal device other than the recipient's mobile device; and upon determining that the received SMS message is to be forwarded to the network connected terminal device, send a copy of the SMS message from the server through a network toward the network connected terminal device, wherein at least one of:

a) the function to determine whether the received SMS message is to be forwarded to a network connected terminal device other than the recipient's mobile device includes functions to:

acquire, from the SMS message, recipient information regarding the recipient of the SMS message;

search the database by using the recipient information to determine if the database indicates that an SMS message addressed to the recipient is to be forwarded to the network connected terminal device; and obtain device information of the network device from the database upon determining that the SMS message is to be forwarded toward the network connected terminal device, and the function to send the copy of the SMS message uses the obtained device information, b) after determining that the SMS message is to be forwarded to the network connected terminal device and before sending a copy of the SMS message to the network connected terminal device the program further causes the server to execute functions to:

determine whether a protocol of the SMS message and a protocol for the network connected terminal device to receive messages are different; and upon determining that the protocols of the SMS message and network connected terminal device are different, change the protocol of the SMS message to a protocol for the network connected terminal device to receive the SMS message before the copy of the SMS message is sent toward the network connected terminal device, or c) the program further causes the server to:

before sending a copy of the SMS message, determine whether an acknowledgement notification has been received from the recipient's mobile device, the acknowledgement notification indicating that the SMS message has been successfully delivered to the recipient's mobile device, and upon determining that an acknowledgement notification has not been received, send the copy of the SMS message toward the network connected terminal device.

17. The server of claim 16 wherein:

the function to determine whether the received SMS message is to be forwarded to a network connected terminal device other than the recipient's mobile device includes:

to acquire, from the SMS message, recipient information regarding the recipient of the SMS message;

to search the database by using the recipient information to determine if the database indicates that an SMS message addressed to the recipient is to be forwarded to the network connected terminal device; and to obtain device information of the network device from the database upon determining that the SMS message is to be forwarded toward the network connected terminal device, and the function to send the copy of the SMS message uses the obtained device information.

18. The server of claim 17, wherein the recipient information is a mobile phone number of the recipient's mobile device and the device information is an IP address of the network connected terminal device.

19. The server of claim 16, wherein the functions further comprises:

after determining that the SMS message is to be forwarded to the network connected terminal device and before sending a copy of the SMS message to the network connected terminal device, to determine whether a protocol of the SMS message and a protocol for the network connected terminal device to receive messages are different; and upon determining that the protocols of the SMS message and network connected terminal device are different, to change the protocol of the SMS message to a protocol for the network connected terminal device to receive the SMS message.

20. The server of claim 16, wherein the program further causes the server to execute a function to send a notification to a sender of the SMS message, the notification indicating that the SMS message has been forwarded to the network connected terminal device.

21. The server of claim 16, wherein the program further causes the server, before sending a copy of the SMS message, to determine whether an acknowledgement notification has been received from the recipient's mobile device, the acknowledgement notification indicating that the SMS message has been successfully delivered to the recipient's mobile device, and upon determining that an acknowledgement notification has not been received, to send the copy of the SMS message toward the network connected terminal device.

* * * * *